Jan. 15, 1952  W. I. JONES  2,582,383
METHOD OF MAKING CAPS FOR FASTENER MEMBERS
Filed Nov. 18, 1948
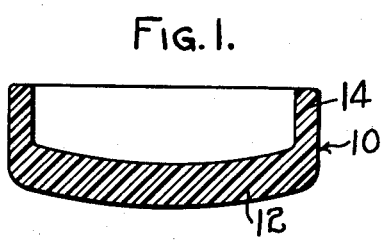
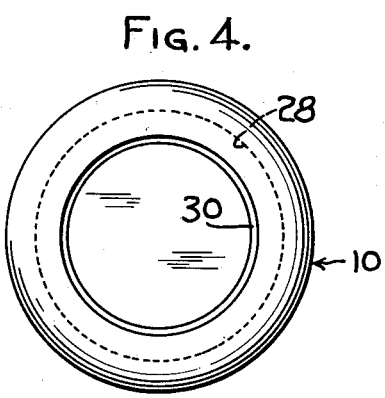
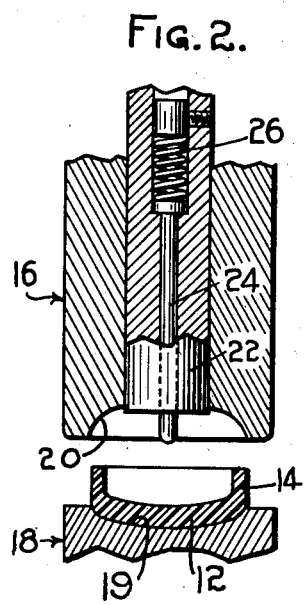
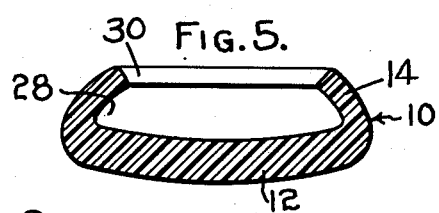
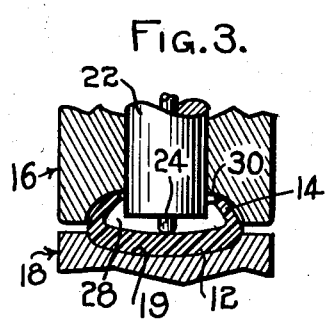
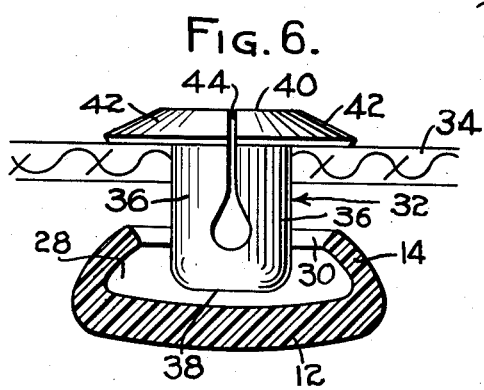
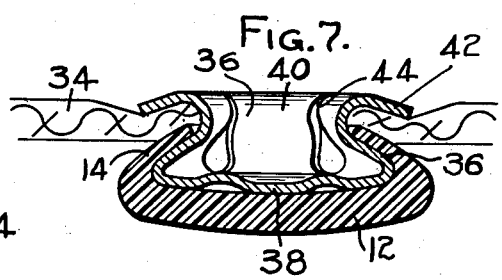
INVENTOR:
WALTER I. JONES
By Philip E. Parker
ATTORNEY.

Patented Jan. 15, 1952

2,582,383

UNITED STATES PATENT OFFICE 2,582,383

METHOD OF MAKING CAPS FOR FASTENER MEMBERS

Walter I. Jones, Somerville, Mass., assignor to United-Carr Fastener Corporation, Cambridge, Mass., a corporation of Massachusetts Application November 18, 1948, Serial No. 60,786

6 Claims. (Cl. 18—59)

1

This invention relates generally to plastic caps for snap fastener sockets and the like and has particular reference to a method of manufacturing such caps.

It has been found desirable to utilize a plastic cap, free of any metal part, in cooperation with the attaching member on snap fastener sockets and similar devices. One important advantage of plastic members over metal members for such application is their neater and more permanent appearance. A desired color may be imparted to a metal member only by means of a surface coating, whereas a plastic member may have the desired color incorporated in the material itself. In the former case the coating rapidly wears off during use, impairing the appearance of the device, but in the case of a plastic cap, since the color extends throughout the body of the member, the wear does not appreciably effect its appearance.

Forming such a member of metal is a simple operation. However, certain difficulties have been encountered in attempting to form such a member of a plastic material, such as a synthetic organic thermoplastic resin. During the forming operation, a recess must be provided in the cap to receive an attaching member, and it is the forming of this recess which creates difficulty. The recess cannot be molded directly since it would be impossible to extract the molding die from the cap. Instead, the cap must be molded so as to have a base and a cavity formed by substantially perpendicular peripheral walls, to enable the molding die to be extracted from the cavity, and the required recess must be produced by a subsequent operation. It has also been found that in forming the recess by conventional methods the strength of certain plastics is impaired to such an extent that subsequent forming and attaching operations frequently cause breaking or splitting of the cap.

The object of this invention is to provide a method for making plastic caps which provide a suitable recess in the cap which is adapted to receive an attaching member.

A further object of the invention is to provide a method of forming plastic caps from molded cap blanks in which the forming operation provides an opening and an adjacent recess for receiving an attaching member.

A still further object of the invention is to provide a method of making plastic caps for snap fastener socket members and the like which does not impair the strength of the material, so that the cap will not be damaged during subsequent forming and attaching operations.

2

Another object of the invention is to provide a method of initially forming thermoplastic resinous members without impairing the strength of the member, so that subsequent forming operations may be accomplished without damage to the member.

For a fuller understanding of the nature and the objects of the invention, reference should be had to the following detailed description taken in conjunction with the accompanying drawing in which:

Fig. 1 is a vertical cross sectional view of a molded member which is to be formed in accordance with the method of the invention;

Fig. 2 is a view in elevation, partly in section, of the molded member of Fig. 1 in position between suitable forming members;

Fig. 3 is a view in elevation, partly in section, of the molded member and the apparatus of Fig. 2 showing the operation of the apparatus during a forming operation;

Fig. 4 is a plan view of a cap which has been formed as illustrated in Fig. 3;

Fig. 5 is a vertical cross sectional view of the member of Fig. 4;

Fig. 6 is a view in elevation, partly in section, of the cap member of Figs. 4 and 5 and a cooperating attaching member in position for assembly;

Fig. 7 is a view in elevation, partly in section, of the assembled cap and attaching member.

Referring to the drawing, there is illustrated a cap 10 which has been molded of a plastic material, preferably a synthetic organic thermoplastic resin. The molding may be accomplished in the usual manner so as to provide a base 12 and an upstanding peripheral wall 14. The base 12 is preferably relatively rigid and the wall 14 is substantially thinner and more flexible than the base. To prepare the cap for attachment, it is subjected to a forming operation, as illustrated in Fig. 2. The cap 10 is placed between a punch 16 and a cooperating die 18. The punch 16 is provided with a concave face 20 and has a slidable positioning member 22 disposed centrally therein. An ejector pin 24 may be provided in the positioning member and is maintained in the extended position by a spring 26. The positioning member 22 is provided with actuating means (not shown) to extend the member downwardly from the face 20 a predetermined distance during the downward stroke of the punch 16 before the face 20 engages the cap member 10. The die 18 is provided with a recess 19 which conforms to the shape of the base 12.

In operation, as the punch 16 descends, the ejector pin 24 engages the base 12 of the cap thereby forcing the pin 24 inwardly, and compressing the spring 26. The actuating means extends the positioning member 22 outwardly from the face 20 and as the punch descends further, the concave face 20 engages the wall 14 turning the wall inwardly to form a cap having a recess 28 and an opening 30, as illustrated in Figs. 4 and 5. The positioning member 22, by restraining the inward movement of the edge of the wall 14, insures that the opening 30 will be of the proper size and in correct position in relation to the base 12 of the cap. On separation of the punch and die, the ejecting pin 24 is forced outwardly by the spring 26, thereby ejecting the formed cap from the punch 16.

Referring to Figs 6 and 7, there is illustrated the method of assembling the cap with a socket piece 32 and a sheet of supporting material 34. The socket piece 32 is initially in tubular form and comprises a number of flexible sections 36 which are joined at one end by connecting portion 38. The sections 36 define at their other end a yielding stud-receiving entrance 40 and each of the sections 36 has a laterally extending flange element 42 adjacent the stud-receiving entrance. When the parts of the fastener are in final secured assembly with the support 34, the side edges 44 of the flange elements 42 substantially abut to form a substantially continuous flange. Other well known types of sockets may be used as will be understood by those skilled in the art.

To secure the socket piece in assembly with the support, the socket piece is mounted in a die (not shown) and the sections 36 are extended through an opening in a support 34, as shown in Fig. 6. The cap part 10 is also secured to a die (not shown) and as one die is moved toward the other, the connecting portion 38 of the socket piece is forced against the inner surface of the base 12 of the cap 10. As pressure is continued, the sections 36 of the socket piece are transformed from their generally tubular shape, shown in Fig. 6 into their finished or bulged shape, shown in Fig. 7. During the attaching operation the wall 14 of the cap 10 may be turned further inwardly and is firmly held by the clinching action of the flange elements 42.

It will thus be seen that when the socket piece is in final collapsing attachment within the cap part that the yielding sections 38 of the socket piece lap upon the inner surface of the wall 14, as most clearly shown in Fig. 7, and preferably substantially follow the contour of the inner surfaces of the base 12 and wall 14. In this way the cap is locked to the socket piece and also to the material. The stud-receiving entrance 40 of the socket piece is normally of smaller diameter than a cooperating stud head (not shown) with the result that insertion of the stud head through the entrance causes the yieldable sections 36 to expand and then to contract after the stud head has been moved a predetermined distance through the entrance and thereby resiliently engage the stud head in a manner well known to those skilled in the art.

The plastic cap may be sufficiently flexible to allow the wall portion, which in my preferred form is in abutting engagement with the yieldable sections 36, to flex outwardly with the sections 36 during expansion of the sections while the stud is being moved into engagement therewith and to contract with the sections 36 as they engage the stud head. This flexibility of the plastic wall 14 permits a uniform and continuous flexibility of the socket piece with the result that the fastener action remains constant after repeated engagement and disengagement of the stud and socket member. If the wall 14 is not sufficiently flexible or if the base 12 is not strong enough, the internal stress applied to the cap during the assembly operation may cause the cap to split or crack in the attaching machine, or to fail in service.

Such forming operations on thermoplastic resins must usually be done with the application of heat to soften the material and prevent stresses being imparted to the formed member which may crack the material during forming or cause unmolding or failure in service. However, I have found that when this particular forming operation is done on certain types of thermoplastic resins with the application of heat, the strength of the material is impaired to such an extent that the resulting caps are not able to withstand the stresses imparted thereto during subsequent forming and attaching operations. Generally, forming with heat has been found to impair the strength of thermoplastics which contain a plasticizer to render the material more flexible.

Although as pointed out above it has been considered impractical to form such members without heat, nevertheless I have discovered that such members may not only be formed at room temperature without cracking or subsequent unmolding but that such forming at room temperature does not impair the strength of the material as does forming with such heat. The reason for this difference in strength has not yet definitely been determined although it is believed that the application of heat during the initial forming can cause sufficient evaporation of the plasticizer from the material to render it too brittle to withstand subsequent forming and attaching operation. Regardless of the theoretical reasons for this strength, experiment has shown that a high percentage of members made of this type of thermoplastic that are initially formed with the application of heat will split or crack during the subsequent attaching operation, whereas almost none of the members that have been formed at room temperatures fail during subsequent attaching operations, nor are they subject to unmolding in service. In either case, the subsequent attaching operation may be accomplished with the addition of heat, provided that the cap is not heated to such a degree that the material is weakened by softening, or the cap will be unable to withstand the stresses imparted thereto during the attaching operation.

The method of my invention is not limited to the manufacture of snap fasteners, but is also applicable to many other devices of a similar nature.

I claim:

1. The method of forming and attaching one-piece metal free plastic caps for snap fasteners and the like, said caps having a base and an upstanding peripheral wall which comprises the steps of turning said wall inwardly about its circumference to form a recess and an opening disposed to receive and retain an expansible attaching member and assembling with the body an attaching member having a body-entering portion and a flange portion so that the body-entering portion expands into the recess and said flange portion retains the wall in the inwardly turned position.

2. The method of forming and attaching snap fastener caps and the like, which are to be subjected to expansive stresses during attachment, which comprises the steps of molding a thermoplastic resin to form a body having a relatively thick base and an upstanding circumferential wall which is substantially thinner and more flexible than the base, initially forming the body by pressing between dies shaped and arranged to turn the wall inwardly to form a recess and a restricted opening disposed to receive an attaching member, and then expanding a portion of an attaching member into the recess, and then turning the wall further inwardly over the expanded portion of the attaching member.

3. The method of making a cap for snap fastener sockets and the like from a body having a base member and a peripheral wall formed of thermoplastic resin, said cap to be subjected to expansive stresses during attachment, which comprises the step of initially forming the body by pressing between dies shaped and arranged to turn the wall inwardly to form a recess and a restricted opening disposed to receive an attaching member, and then expanding a portion of an attaching member into the recess, and turning the wall further inwardly over the expanded portion of the attaching member.

4. The method of forming and attaching snap fastener caps and the like which are to be subjected to expansive stresses during attachment, which comprises the steps of molding a synthetic organic thermoplastic resin to form a body having a relatively thick base and an upstanding circumferential wall which is substantially thinner and more flexible than the base, and then after molding, pressing the body between dies shaped and arranged to turn the wall inwardly to form an internal peripheral recess and a restricted opening, and then assembling with the body an attaching member having a lower body entering portion and an upper flange portion by expanding the body entering portion into the recess and forcing the flange portion onto the inwardly turned wall whereby the movement of the flange portion during assembly turns the wall further inwardly over the expanded portion of the body entering portion.

5. The method of forming snap fastener caps and the like, which are to be subjected to expansive stresses during attachment to a socket member which comprises molding a thermoplastic material to form a hollow cup-shaped body having a relatively thick base and an upstanding circumferential wall which is substantially thinner and more flexible than the base, forming the body by pressing between dies shaped and arranged to turn the wall inwardly to form a divergent walled recess having a restricted opening and limiting the inward turning movement of the wall by contacting the edge thereof with a movable positioning member associated with one of said dies and disposed within said recess during inward turning of the wall to thereby insure that the opening is of the proper size and in correct position in relation to the base of the cap.

6. The method of forming snap fastener caps and the like, which are to be subjected to expansive stresses during attachment to a socket member which comprises molding a thermoplastic material to form a hollow cup-shaped body having a relatively thick base and an upstanding circumferential wall which is substantially thinner and more flexible than the base, forming the body by pressing between dies shaped and arranged to turn the wall inwardly to form a divergent walled recess having a restricted opening, and restraining the inward movement of the edge of said wall by a positioning member associated with one of said dies and having a portion thereof disposed within said cup-shaped member for engagement by the edges of said wall as it is turned inwardly, the restraining action of said positioning member insuring an opening of a predetermined proper size and in correct position in relation to the base of the cap.

WALTER I. JONES.

REFERENCES CITED

The following references are of record in the file of this patent:

UNITED STATES PATENTS

| Number | Name | Date |
|---|---|---|
| 1,138,021 | Snyder | May 4, 1915 |
| 1,943,063 | Fenton | Jan. 9, 1934 |
| 2,072,837 | Helm | Mar. 2, 1937 |
| 2,273,190 | Harrison | Feb. 17, 1942 |
| 2,431,238 | Friedman | Nov. 18, 1947 |